United States Patent [19]

Bishop et al.

[11] Patent Number: 5,472,229
[45] Date of Patent: Dec. 5, 1995

[54] MOUNTING OF A THRUST NEUTRAL INFLATOR FOR AIR BAG MODULES

[75] Inventors: Robert J. Bishop, Mt. Clemons; Richard L. Frantom, Richmond; Robert M. Kremer; Klaus F. Ocker, both of Fraser, all of Mich.; Roy G. Brown, Hot Springs, Ak.; Teresa L. Bazel, Annandale; Donald W. Renfoe, Haymarket, both of Va.

[73] Assignee: Bendix-Atlantic Inflator Company, Sterling Hts., Mich.

[21] Appl. No.: 184,364

[22] Filed: Jan. 21, 1994

Related U.S. Application Data

[63] Continuation of Ser. No. 856,799, Mar. 24, 1992, abandoned.

[51] Int. Cl.⁶ .................................................. B60R 21/26
[52] U.S. Cl. ............................. 280/728.2; 280/736
[58] Field of Search ........................... 280/736, 737, 280/740, 741, 742, 728 A; 222/3; 422/164, 165, 166; 102/530, 531

[56] References Cited

U.S. PATENT DOCUMENTS

| | | | |
|---|---|---|---|
| 3,441,290 | 4/1969 | Berryman et al. | |
| 3,778,084 | 12/1973 | Sutherland et al. | |
| 3,880,447 | 4/1975 | Thorn | 280/741 |
| 4,021,058 | 5/1977 | Suzuki et al. | 280/737 |
| 4,084,839 | 4/1978 | Takagi et al. | 280/736 |
| 4,114,924 | 9/1978 | Kasagi et al. | 280/740 |
| 4,178,017 | 12/1979 | Ishi et al. | 280/740 |
| 4,817,828 | 4/1989 | Goetz | 280/736 |
| 4,964,654 | 10/1990 | Bishop et al. | 280/741 |
| 5,022,674 | 6/1991 | Frantom et al. | 280/741 |
| 5,058,921 | 10/1991 | Cuevas | 280/736 |
| 5,076,607 | 12/1991 | Woods et al. | 280/737 |

FOREIGN PATENT DOCUMENTS

| | | |
|---|---|---|
| 2669875 | 6/1992 | France . |
| 3733436 | 4/1988 | Germany . |
| 2251221 | 7/1992 | United Kingdom ................. 280/736 |
| 90/13458 | 11/1990 | WIPO . |

*Primary Examiner*—Karin L. Tyson
*Attorney, Agent, or Firm*—Markell Seitzman

[57] ABSTRACT

An air bag module (50) comprising an inflator (40) for generating inflation gas; an air bag (12) disposed about the inflator to receive the inflation gas exiting the inflator; a structure (52) for supporting at least the inflator. The inflator comprises: a pressure vessel (42) and a plurality of exit ports (16). The exit ports are arranged to render the inflator in a thrust neutral condition when the inflator is not attached to the structure. A plug (60) or plugs is provided for closing a designated set of exit ports to render the inflator in a non-thrust neutral condition when supported by the structure. Each plug is received in each of the designated exit ports and is preferably received though a portion of the structure such that if the inflator is removed from the structure each plug must also be removed, thereby opening all of previously closed exit ports and rendering the inflator in its thrust neutral condition once again.

9 Claims, 2 Drawing Sheets

5,472,229

MOUNTING OF A THRUST NEUTRAL INFLATOR FOR AIR BAG MODULES

This application is a continuing of application Ser. No. 07/856,799, filed Mar. 24,1992, now abandoned.

BACKGROUND AND SUMMARY OF THE INVENTION

The present invention relates generally to supplemental inflatable restraint (air bag) systems and more particularly to a hybrid inflator.

A hybrid inflator comprises a pressure vessel into which is stored a quantity of inert, pressurized gas. Means are provided to selectively open a passage leading from the pressure vessel to exit ports to permit the egress of the inflation gas. Such means typically includes a mechanism for braking a rupturable disk. Hybrid inflators may also include heat generators, such as a quantity of propellant, to heat the gas remaining in the pressure vessel thereby achieving a more efficient inflation of the air bag. It is a requirement that the orientation of the exit ports be arranged to maintain the hybrid inflator in a thrust neutral condition when gases exit the inflator and specifically when the inflator is not part of an air bag module. By thrust neutral it is meant that when gas exits the exit ports the resultant of the reaction forces is essentially zero. As can be appreciated, if the hybrid inflator were not thrust neutral and is accidentally energized or gas is discharged, such as from an over pressurization due to fire, etc., the inflator could be propelled about due to the non-zero resultant forces generated by the exiting gas flow.

As such, the above thrust neutral requirement is beneficial when the hybrid inflator is being carried, shipped, etc. However, the above requirement, as will be seen below, reduces the efficiency of the air bag inflation process. Accordingly, the invention comprises: an air bag module comprising: an inflator for generating inflation gas; an air bag disposed about the inflator to receive the inflation gas exiting the inflator; a structure for supporting at least the inflator. The inflator comprising: a pressure vessel and a plurality of exit ports through which inflation gas exits the inflator. The exit ports are arranged to render the inflator in a thrust neutral condition when the inflator is not attached to the structure. The module comprising first means for closing a designated set of exit ports to render the inflator in a non-thrust neutral condition when supported by the structure. The first means includes a plug received in each of the designated exit ports. Each plug is preferably received though a portion of the structure such that if the inflator is removed from the structure each plug must also be removed, thereby opening all of the previously closed exit ports and rendering the inflation in its thrust neutral condition once again.

Many other objects and purposes of the invention will be clear from the following detailed description of the drawings.

DETAILED DESCRIPTION OF THE DRAWINGS

Figure 1:
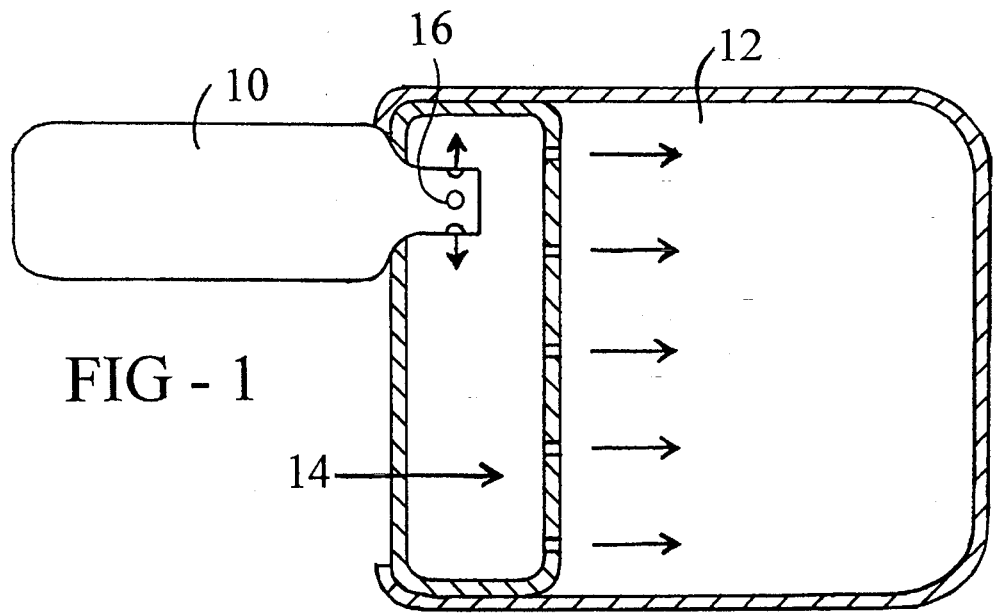
FIG. 1 is illustrative of a prior art hybrid inflator.

FIG. 1 illustrates a prior art hybrid inflator 10 for an air bag 12. The inflator 10 is secured within a manifold 14 or similar support structure. As can be seen, the inflator includes a plurality of exit ports 16, situated about one end thereof. What is not shown is the mechanism within the inflator which releases of the stored inflation gas. Regardless of how gas is released, it can be appreciated that gas exiting the equally spaced exit ports 16 will yield a thrust neutral condition. The concept of a thrust neutral inflator is beneficial, but when the inflator is installed in a module, the thrust neutral feature is a source of inefficiency. To achieve rapid inflation of an air bag, it is desirable that inflation gases exit the inflator and enter directly into the air bag. Since gas flow out from a hybrid inflator is multi-directional hybrid inflators typically include some mechanism to redirect certain parts of the gas flow into the air bag. This redirection is accomplished by the above mentioned manifold, or housing, etc. which may take a variety of configurations.

Figure 2:
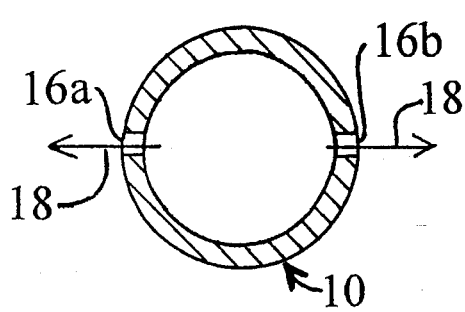
FIGS. 2 through 5 illustrate exit port orientations of a hybrid inflator.
Figure 3:
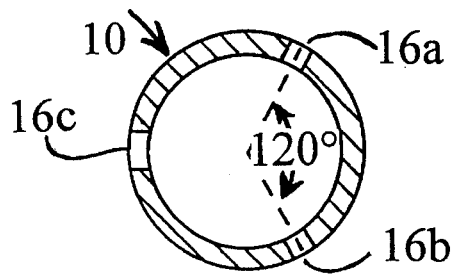
Figure 4:
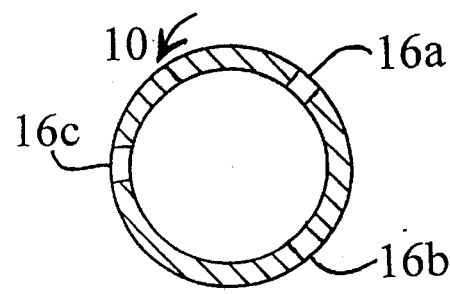
Figure 5:
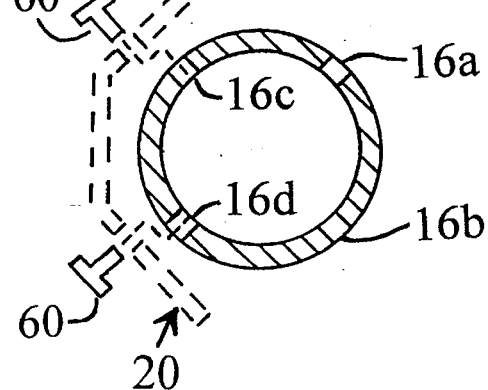

Reference is made to FIG. 2 which illustrates an end cross-sectional view of a typical hybrid inflator 10 having only two exit ports 16a and 16b. FIGS. 3 through 5 illustrate the utilization of the hybrid inflator having other discrete exist port configurations. The arrows 18 emanating from each of the ports illustrate the direction of the inflation gas stream as it exits the inflator. FIG. 3 illustrates three equally spaced and sized exit ports 16a–16c. FIG. 4 shows three asymmetrically located exit ports. The flow area of port 16c is greater than the flow area of either ports 16a or 16b to yield thrust neutrality. Typically the area of ports 16a and 16b are equal. The size of port 16c will also vary with the angular spacing between ports 16a and 16 b. FIG. 5 illustrates the use of four (4) equally spaced and sized exit ports 16a–16d.

Figure 6:
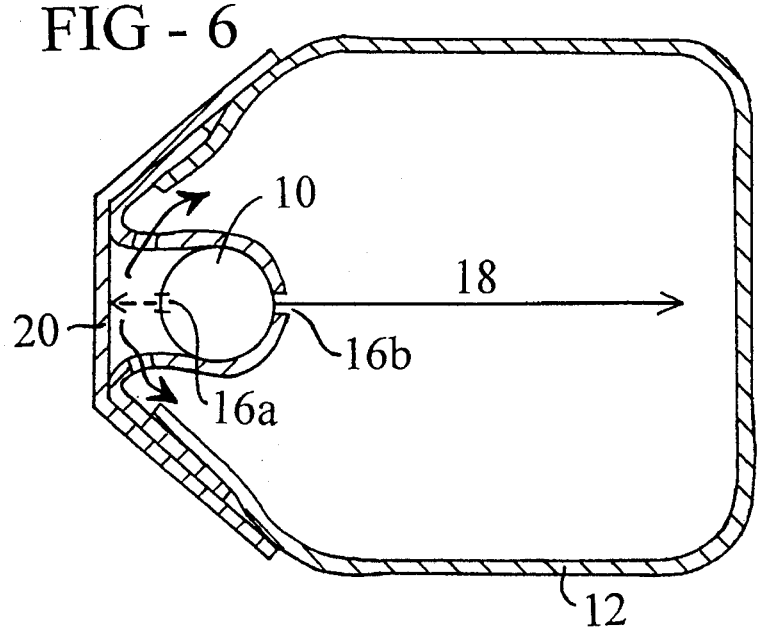
FIG. 6 illustrate an inflator in an air bag module.

Reference is now made to FIG. 6 which illustrates an inflator secured to a housing 20 which is often referred to as a reaction can, housing, manifold or member in the art. The purpose of the housing 20 is to support the inflator as well as to intercept the inflation gas stream flow and redirect same into the airbag. By way of example, the inflator shown is therein uses two exit ports. As can be appreciated, one-half of the inflation gas will exit one of the ports such as 16i aand directly impinge upon the housing 20 while the other one-half of the inflation gas exits the opposite port 16b and flows generally directly into the air bag. With regard to the gases exiting port 16a, it can be appreciated that such gases represent a heated, pressurized, high velocity stream. As the gases impinge upon the housing 20, a certain amount of heat energy is lost, that is, absorbed by the housing which is typically at a lower temperature than the inflation gases. Since a relatively few exit ports are used, the high temperature inflation gases will impinge on a localized area of the housing causing perhaps, excessive heat, localized over pressurization, the need to reinforce the structure, and potential degradation of air bag material that may be located within the impingement area. As the reaction housing 20 must be designed to redirect the stream of inflation gas it becomes more a complicated and costly component than may otherwise be needed resulting in increased weight, cost, and size of an air bag module.

Figure 7:
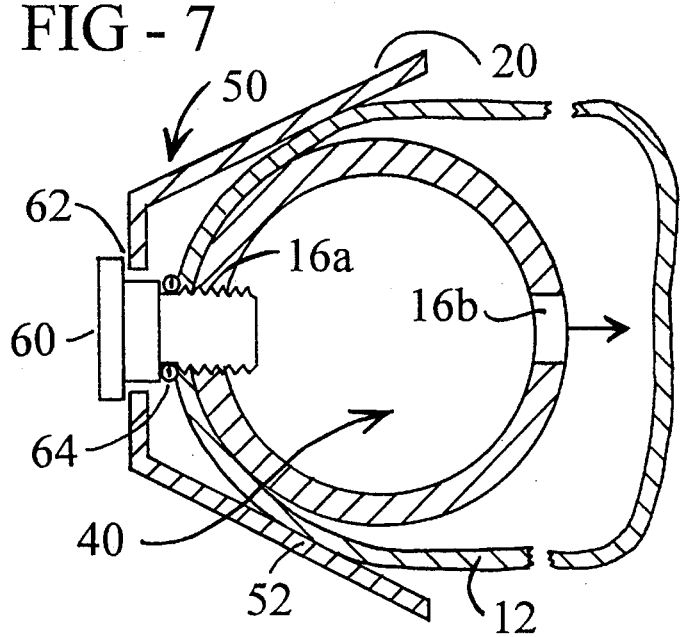
FIG. 7 shows a cross-sectional view of a hybrid inflator and air bag module.
Figure 8:
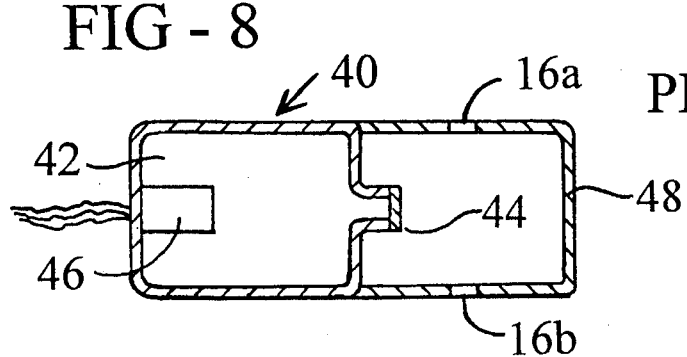
FIG. 8 diagrammatically illustrates various elements of a prior art hybrid inflator.

Reference is now made to FIG. 7 which shows a hybrid inflator 40 forming part of an air bag module 50. The cross-sectional view of the hybrid inflator is diagrammatically shown in FIG. 8. Exemplary hybrid inflators are shown in U.S. Pat. Nos. 5,022,674 and 5,076,607, which are incorporated herein by reference. The hybrid inflator 40 comprises a pressure vessel portion 42 into which is stored pressurized Argon gas. The pressure vessel portion includes a rupturable disk 44 that may be opened by any known means such as that illustrated in the above patent. The inflator 40 further includes a heat generating member 46, such as a gas generator also shown in the above patents. Upon rupturing of the disc 44, the gases enter into a non-pressure vessel portion 48 and then flow out of the plurality of exit ports 16. While two such exit ports 16a and 16b are illustrated, it should be appreciated that any number of port orientations can be used. In the case of two exit ports, the size of each exit port is chosen to be identical so as to maintain the thrust neutral feature of the hybrid inflator when it is out of the module. The size of each exit port 16a and b is also chosen such that the area of one port is appropriate to fill the airbag at its prescribed fill rate and pressure. This feature is because the port facing away from the air bag will be closed. In the invention's most simple form, one port such as 16a, is internally threaded to accept a plug such as 60.

Figure 9:
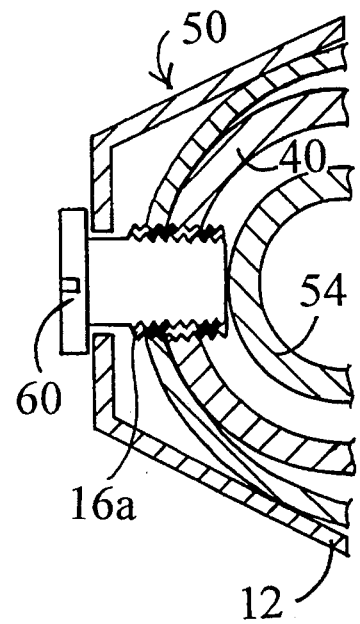
FIG. 9 shows an alternative embodiment of the invention.

As is typical in the art, the hybrid inflator 40 may be secured to a housing 52 in the manner as described in the above patents. With the inflator 40 so positioned within the housing, the plug 60 is inserted through an opening 62 therein into the threaded exit port such as 16a. If needed a seal 64 such as an o-ring can be used to further seal the interface between the plug and the exit port. The housing, plug and inflator cooperate in a manner so that if the inflator is removed from the housing the plug must also be removed. As can be seen, with the plug 60 removed the inflator is once again rendered thrust neutral. If a port orientation such as that shown in FIG. 5 is used two such plugs 60 and 60b are used to prevent reverse gas flow through the rearward facing ports 16c and 16d. FIG. 9 illustrates as alternate embodiment of the invention in which the threads of the plug are covered with a thread sealant material thereby replacing the o-ring. The inflator 40 of FIG. 9 diagrammatically shows a gas generator housing 54. Such gas generator housing is shown in greater detail in U.S. Pat. No. 5,076,607. The gas generator housing is located in the non-pressure vessel portion 48 of the inflator. As shown in FIG. 9 plug 60 is inserted within the threaded port 16a and bottoms out on the gas generator housing. The reaction force between the plug and the gas generator housing provides for a secure fit therebetween.

Accordingly, it can be seen that the present invention satisfies the requirement that the hybrid inflator be thrust neutral when it is not within an air bag module; and additionally, when installed, as part of an airbag module, inflation gases are directed to flow only toward the airbag without requiring the physical redirection or deflection. As such, all of the inflation energy of the hybrid inflator is caused to flow outwardly through one or more exit port(s) to permit the direct flow of inflation gas into the air bag.

As can be seen from the above, the present invention permits the utilization of a pressure vessel/hybrid inflator as a thrust neutral gas container and also when such inflator is installed in an air bag module provides for the improved inflation of the air bag. It should appreciated that since inflation gases do not exit rearwardly from the inflator, heat energy is not lost due to the heating up of closely spaced components such as the housing 52. The kinetic energy of the gas is maintained at a high level as the gas stream need not be redirected, the support structures can be reduced in weight, cost, etc. since they no longer have to be designed to withstand the localized heating and pressurization resulting from the impinging inflation gases.

Many changes and modifications in the above described embodiment of the invention can, of course, be carried out without departing from the scope thereof. Accordingly, the scope is intended to be limited only by the scope of the appended claims.

We claim:

1. An air bag module (50) comprising:

an inflator (40); an air bag (12) communicatively disposed relative to the inflator to receive inflation gas exiting the inflator; a structure (52) for supporting at least the inflator; the inflator comprising:

a pressure vessel (42) and a plurality of exit ports (16) through which inflation gas exits the inflator, the exit ports arranged to render the inflator in a thrust neutral condition when the inflator is not attached to the structure, the module comprising first means (60) for mounting the pressure vessel to the structure and for closing a designated set of exit ports, preventing gas flow therethrough, to render the inflator in a non-thrust neutral condition when supported by the structure.

2. The module as defined in claim 1 wherein the exit ports are arranged about a portion of the inflator such that some of the inflation gas would normally exit the designated set of exit ports in a first direction generally opposite the direction of inflation of the air bag, and wherein the first means comprises means to prevent the inflation gas from flowing in such first direction.

3. The module as defined in claim 2 wherein the first means comprises means to close all of the designated exit ports, including those exit ports which permit inflation gas to exit the inflator in the first direction.

4. The module as defined in claim 3 wherein the first means includes a plug (60) received in each of the designated exit ports.

5. The module as defined in claim 4 wherein each plug (60) is received though a portion of the structure such that if the inflator is removed from the structure each plug must also be removed, thereby opening all of previously closed exit ports and rendering the inflation in its thrust neutral condition once again.

6. The module as defined in claims 4 wherein the inflator (40) includes a walled member (52) opposite the exit ports (16) and wherein an end of the plug 6 engages the walled member (52).

7. A hybrid inflator (40) for inflating an air bag, the inflator comprising a plurality of exit ports arranged thereon such that the inflation gas may exit all such exit ports rendering the inflator thrust neutral first means for mounting the inflator to a support structure and for closing selected ones of the exit ports, prohibiting gas flow through, such at when the inflator is mounted proximate the support structure it is rendered to be non-thrust neutral.

8. The inflator (40) as defined in claim 7, wherein the first means is operative to close certain of the exit ports during assembly of the inflator to the support structure.

9. The inflator, as defined in claim 8, wherein the support structure is between a wall of the inflator having the exit port and a portion of the plug, wherein when it is desired to separate the inflator from the cooperating support structure the plug must first be removed to permit removal of the inflator thereby rendering the inflator thrust neutral once again.

\* \* \* \* \*